United States Patent
Ikoma (10) Patent No.: US 9,977,181 B2
(45) Date of Patent: May 22, 2018

(54) OPTICAL DEVICE AND OPTICAL DEVICE MANUFACTURING METHOD

(71) Applicant: FUJIKURA LTD., Tokyo (JP)

(72) Inventor: Shinya Ikoma, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days. days.

(21) Appl. No.: 15/416,169

(22) Filed: Jan. 26, 2017

(65) Prior Publication Data

US 2017/0131467 A1 May 11, 2017

Related U.S. Application Data (63) Continuation of application No. PCT/JP2015/056096, filed on Mar. 2, 2015.

(30) Foreign Application Priority Data

Jul. 30, 2014 (JP) ................................. 2014-155419

(51) Int. Cl.
G02B 6/02 (2006.01)
G02B 6/036 (2006.01)

(52) U.S. Cl.
CPC ..... *G02B 6/02395* (2013.01); *G02B 6/03622* (2013.01)

(58) Field of Classification Search
CPC ............... G02B 6/036; G02B 6/03694; G02B 6/02395; G02B 6/03622
See application file for complete search history.

(56) References Cited

U.S. PATENT DOCUMENTS

| 5,633,966 A * | 5/1997 | Nakaishi | G02B 6/02138 359/566 |
| 5,708,739 A * | 1/1998 | Patton | G02B 6/02133 359/569 |
| 5,790,726 A * | 8/1998 | Ito et al. | G02B 6/02119 385/142 |

(Continued)

FOREIGN PATENT DOCUMENTS

| JP | 63-41804 A | 2/1988 |
| JP | 1-316705 A | 12/1989 |

(Continued)

OTHER PUBLICATIONS

Office Action dated May 12, 2015, issued in counterpart Japanese Application No. 2014-155419, with English translation (7 pages).

(Continued)

*Primary Examiner* — Thomas A Hollweg
*Assistant Examiner* — Mary A El Shammaa
(74) *Attorney, Agent, or Firm* — Westerman, Hattori, Daniels & Adrian, LLP (57) ABSTRACT

Provided is an optical device whose resin member is less likely to reach a high temperature, as compared with that of a conventional optical device. The optical device (1) includes (i) an optical fiber (11) in which a jacket-removed section (I1) is provided and (ii) a resin member (12) in which the jacket-removed section (I1) is embedded. The jacket-removed section (I1) is a section in which a part of a jacket (112) covering an outer surface of a cladding (111b) is removed so that only a part of the outer surface of the cladding (111b) is exposed in a cross section of the optical fiber (11).

11 Claims, 9 Drawing Sheets

(56) References Cited

U.S. PATENT DOCUMENTS

| | | | |
|---|---|---|---|
| 5,867,618 A * | 2/1999 | Ito et al. ............ | G02B 6/02114 |
| | | | 385/123 |
| 5,995,697 A | 11/1999 | Byron et al. | |
| 2009/0184437 A1* | 7/2009 | Hayashi .................. | B29C 70/48 |
| | | | 264/101 |
| 2011/0085768 A1* | 4/2011 | Nakanishi | |
| | | et al. ................. | C03B 37/02727 |
| | | | 385/102 |
| 2012/0052213 A1 | 3/2012 | Terada | |

FOREIGN PATENT DOCUMENTS

| | | |
|---|---|---|
| JP | 2010-181574 A | 8/2010 |
| JP | 2011-186399 A | 9/2011 |
| WO | 2014/002715 A1 | 1/2014 |

OTHER PUBLICATIONS

Notice of Allowance (NOA) dated Nov. 4, 2015, issued in counterpart Japanese Application No. 2014-155419 (3 pages).
European Search Report dated Jun. 21, 2017, issued in counterpart application No. 15828316.8. (9 page).

* cited by examiner

OPTICAL DEVICE AND OPTICAL DEVICE MANUFACTURING METHOD

CROSS-REFERENCE TO RELATED APPLICATIONS

This application is a Continuation of PCT International Application No. PCT/JP2015/056096 filed in Japan on Mar. 2, 2015, which claims the benefit of Patent Application No. 2014-155419 filed in Japan on Jul. 30, 2014, the entire contents of which are hereby incorporated by reference.

TECHNICAL FIELD

The present invention relates to an optical device including (i) an optical fiber in which a jacket-removed section is provided and (ii) a resin member in which the jacket-removed section is embedded. The present invention also relates to a method of producing such an optical device.

BACKGROUND ART

Optical fibers such as double cladding fibers and triple cladding fibers, in which light can be confined to a cladding, are in wide use. According to such an optical fiber, unnecessary light that propagates in a cladding (hereinafter referred to as "cladding light") may cause heating in a jacket which covers an outer surface of the cladding. Under the circumstances, in such an optical fiber, it is necessary to cause the cladding light to leak from the cladding through a jacket-removed section in which the jacket has been removed.

Patent Literature 1 discloses an optical device including (i) an optical fiber in which a jacket-removed section is provided (jacket is referred to as a "pre-coating" in Patent Literature 1) and (ii) a resin member in which the jacket-removed section is embedded. According to the optical device disclosed in Patent Literature 1, a refractive index of the resin member is set to be higher than that of a cladding so that cladding light will leak from the cladding into the resin member through the jacket-removed section.

CITATION LIST

Patent Literature

[Patent Literature 1]
Japanese Patent Application Publication Tokukaihei No. 1-316705 (1989) (Publication Date: Dec. 21, 1989)

SUMMARY OF INVENTION

Technical Problem

In a case where such a jacket-removed section, in which a jacket for covering an outer surface of a cladding has been removed, is embedded in a resin member having a refractive index higher than that of the cladding as with the optical device disclosed in Patent Literature 1, cladding light will leak intensively at an entrance end of the jacket-removed section. This causes the resin member near the entrance end of the jacket-removed section to absorb the cladding light and accordingly reach a high temperature.

The present invention has been accomplished in view of the above problem, and an object of an aspect of the present invention is to provide an optical device (i) which includes (a) an optical fiber in which a jacket-removed section is provided and (b) a resin member in which the jacket-removed section is embedded and (ii) in which the resin member is less likely to reach a high temperature, as compared with that of a conventional optical device.

Solution to Problem

In order to attain the above object, an optical device in accordance with an aspect of the present invention includes: an optical fiber in which at least one jacket-removed section is provided; and a resin member in which the at least one jacket-removed section of the optical fiber is embedded, the resin member having a refractive index higher than a refractive index of a cladding of the optical fiber, the at least one jacket-removed section being a section in which a jacket covering an outer surface of the cladding has been partially removed so that only a part of the outer surface of the cladding is exposed in a cross section of the optical fiber.

In order to attain the above object, a method of producing an optical fiber in accordance with an aspect of the present invention includes the steps of: forming a jacket-removed section in an optical fiber; and embedding the jacket-removed section of the optical fiber in a resin member having a refractive index higher than a refractive index of a cladding of the optical fiber, the jacket-removed section being a section in which a jacket covering an outer surface of the cladding has been partially removed so that only a part of the outer surface of the cladding is exposed in a cross section of the optical fiber.

Advantageous Effects of Invention

The present invention makes it possible to provide an optical device in which a resin member is less likely to reach a high temperature, as compared with that of a conventional optical device.

DESCRIPTION OF EMBODIMENTS

The following description will discuss an embodiment of an optical device in accordance with the present invention with reference to the drawings.

[Configuration of Optical Device]

A configuration of an optical device 1 in accordance with the present embodiment will be discussed below with reference to FIG. 1. (a) of FIG. 1 is a top view of the optical device 1, (b) of FIG. 1 is a lateral view of the optical device 1, (c) of FIG. 1 is an A-A' sectional view of the optical device 1, and (d) of FIG. 1 is a B-B' sectional view (in which hatching is omitted) of the optical device 1.

Figure 1:
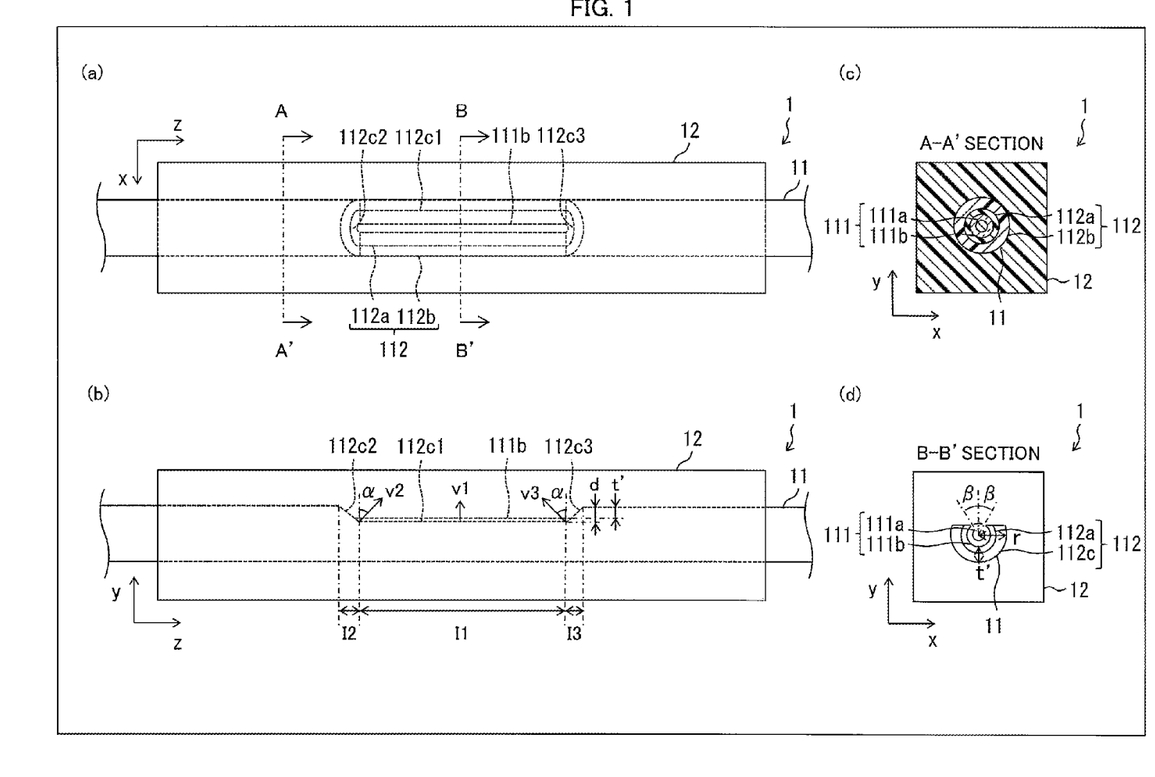
FIG. 1 is a view for describing a configuration of an optical device in accordance with an embodiment of the present invention. (a) of FIG. 1 is a top view of the optical device, (b) of FIG. 1 is a lateral view of the optical device, (c) of FIG. 1 is an A-A' sectional view of the optical device, and (d) of FIG. 1 is a B-B' sectional view of the optical device.

As illustrated in (a) through (d) of FIG. 1, the optical device 1 includes (i) an optical fiber 11 in which a jacket-removed section I1 is provided and (ii) a resin member 12 in which the jacket-removed section I1 of the optical fiber 11 is embedded.

The optical fiber 11, which is a double cladding fiber, includes (i) a core 111a having a columnar shape, (ii) an inner cladding 111b having a cylindrical shape and covering a side surface of the core 111a, (iii) an outer cladding 112a having a cylindrical shape and covering an outer surface of the inner cladding 111b, and (iv) an outer jacket 112b having a cylindrical shape and covering an outer surface of the outer cladding 112a (see (c) of FIG. 1).

According to the optical fiber 11, each of the core 111a and the inner cladding 111b is made of glass. The core 111a and the inner cladding 111b will be hereinafter collectively referred to as a bare fiber 111. According to the optical fiber 11, each of the outer cladding 112a and the outer jacket 112b is made of resin. The outer cladding 112a and the outer jacket 112b will be hereinafter collectively referred to as a jacket 112.

The jacket-removed section I1 of the optical fiber 11 is a section in which the jacket 112, which covers the outer surface of the inner cladding 111b, has been partially removed so that a part of the outer surface of the inner cladding 111b is exposed in a cross section (i.e., a section orthogonal to a central axis of the optical fiber 11).

According to the present embodiment, a part of the jacket 112 is removed in the jacket-removed section I1 and adjacent sections I2 and I3, each of which is adjacent to the jacket-removed section I1, such that a projection of the part thus removed forms a trapezoid on a y-z plane (see (b) of FIG. 1). A cut surface 112c1 of the jacket 112 in the jacket-removed section I1 is therefore a rectangular flat surface having a normal vector v1 which is parallel to a radial direction of the optical fiber 11 (i.e., a y-axis positive direction illustrated in FIG. 1) (see (a) and (b) of FIG. 1). Cut surfaces 112c2 and 112c3 of the jacket 112 in the respective adjacent sections I2 and I3 are semi-elliptical flat surfaces having respective normal vectors v2 and v3, each of which makes an angle smaller than n/2[rad] with the radial direction of the optical fiber 11 (i.e., the y-axis positive direction illustrated in FIG. 1) (see (a) and (b) of FIG. 1).

According to the present embodiment, the jacket 112 is removed in the jacket-removed section I1 by a depth d, which is greater than a thickness t' of the jacket 112 (i.e., a sum of thicknesses of the outer cladding 112a and the outer jacket 112b) (see (b) of FIG. 1). Therefore, in the cross section of the jacket-removed section I1, a part of the outer surface of the inner cladding 111b is exposed within a range of ±β[rad] from the y-axis positive direction without being covered with the jacket 112 (see (d) of FIG. 1). Note that β is calculated by the following Equation (1):

$$\beta = \cos^{-1}[(r-d+t')/r] \quad (1)$$

where r is a radius of the optical fiber 11.

The jacket-removed section I1 of the optical fiber 11 is embedded in the resin member 12 having a refractive index higher than that of the inner cladding 111b of the optical fiber 11. This allows cladding light, which has propagated in the inner cladding 111b of the optical fiber 11, to leak from the outer surface of the inner cladding 111b into the resin member 12 in the jacket-removed section I1. The present embodiment employs, as the resin member 12, a rectangular-parallelepiped resin molded product whose one side surface (i.e., a side surface parallel to a z-x plane in FIG. 1) faces the cut surface 112c1 of the jacket 112 (see FIG. 1).

[Method of Forming Jacket-Removed Section]

Figure 2:
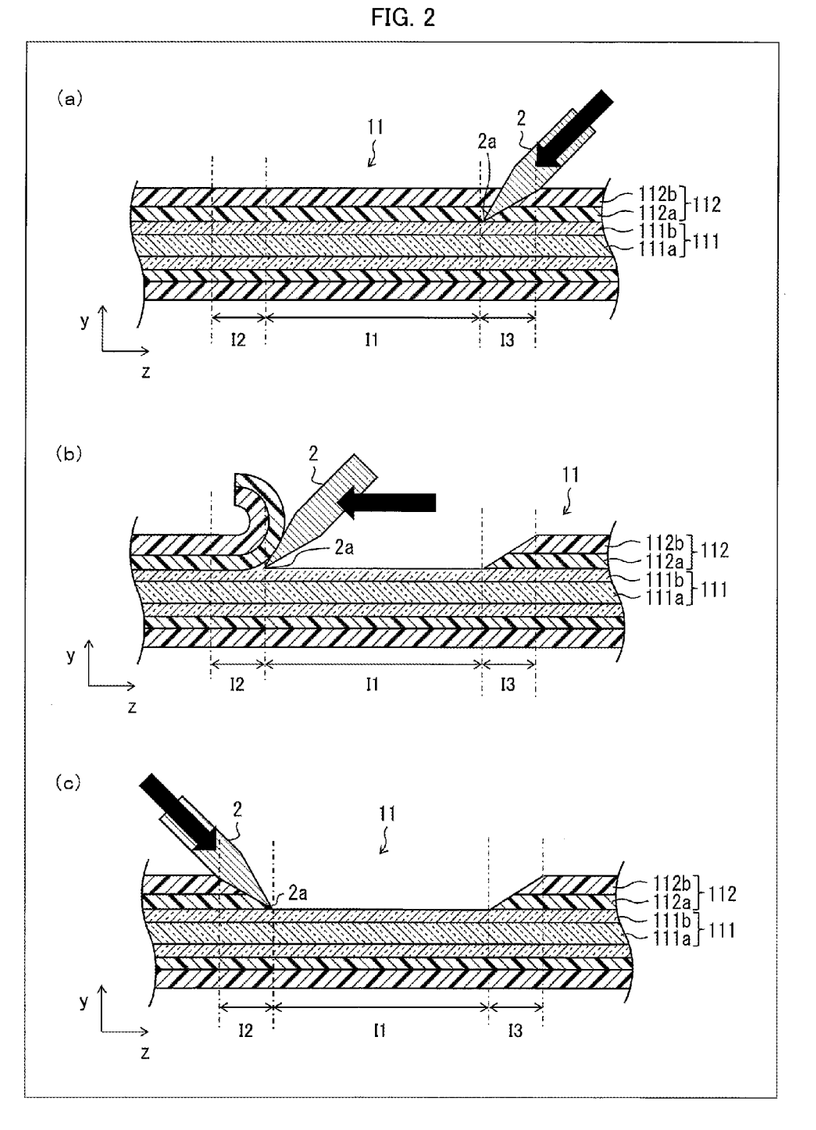
FIG. 2 is a view for describing a method of forming a jacket-removed section in the optical device illustrated in FIG. 1. Each of (a) through (c) of FIG. 2 is a (longitudinal) sectional view of an optical fiber of the optical device.

The following description will discuss, with reference to FIG. 2, a method of forming the jacket-removed section I1. Each of (a) through (c) of FIG. 2 is a sectional view illustrating a longitudinal section of the optical fiber 11 (i.e., a cross section including the central axis of the optical fiber 11).

The jacket-removed section I1 is formed by chipping a part of the jacket 112 off by using a blade 2 having a linear blade edge 2a. More specifically, the jacket-removed section I1 is formed by carrying out the following steps S11 through S13 with respect to the optical fiber 11 that is being stretched between two fiber clamps while a predetermined tensile force is applied thereto.

Step S11: First, the blade 2 is placed at a right end of the adjacent section I3 so that the blade edge 2a is brought into contact with the outer surface of the jacket 112. The blade 2 is then inserted obliquely into the jacket 112 so that the blade edge 2a is pressed to the outer surface of the inner cladding 111b at a right end of the jacket-removed section I1. (a) of FIG. 2 illustrates a longitudinal section of the optical fiber 11 which has been subjected to the process of the step S11.

Step S12: Subsequently, the blade 2 is moved, while the blade edge 2a is being pressed to the outer surface of the inner cladding 111b, parallel to the central axis of the optical fiber 11 until the blade edge 2a reaches a left end of the jacket-removed section I1. (b) of FIG. 2 illustrates a longitudinal section of the optical fiber 11 which has been subjected to the process of the step S12.

Step S13: Subsequently, the blade 2 is placed at a left end of the adjacent section I2 so that the blade edge 2a is brought into contact with the outer surface of the jacket 112. The blade 2 is then inserted obliquely into the jacket 112 so that the blade edge 2a is pressed to the outer surface of the inner cladding 111b at a left end of the jacket-removed section I1. (c) of FIG. 2 illustrates a longitudinal section of the optical fiber 11 which has been subjected to the process of the step S13.

By pressing, in the step S12, the blade edge 2a to the outer surface of the inner cladding 111b with a sufficiently high pressure, it is possible to cause the depth d, by which the jacket 112 is removed in the jacket-removed section I1, to be greater than the thickness t' of the jacket 112 as illustrated in (b) of FIG. 1. In other words, it is possible to expose, in the cross section of the jacket-removed section I1, a part of the outer surface of the inner cladding 111b within the range of ±β[rad] from the y-axis positive direction.

Figure 3:
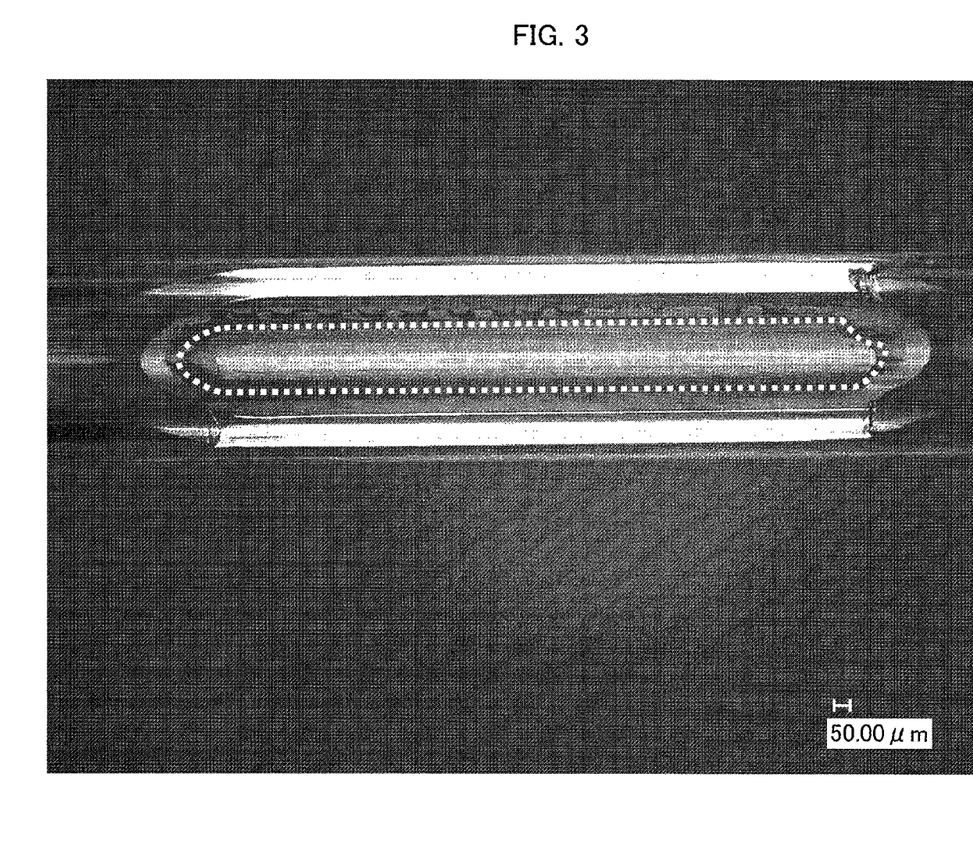
FIG. 3 is a photomicrograph of the optical fiber in which the jacket-removed section is provided by the method illustrated in FIG. 2.

The following description will confirm, with reference to FIG. 3, that the jacket-removed section I1 illustrated in FIG. 1 can be formable by the above-described method. FIG. 3 is a photomicrograph of the optical fiber 11 in which the jacket-removed section I1 is provided by the above-described method.

In FIG. 3, a region in which the outer surface of the inner cladding 111b is exposed is surrounded by a white dotted line. According to FIG. 3, it is shown in the cross section of the jacket-removed section I1 that a part of the outer surface of the inner cladding 111b is exposed within the range of ±β[rad] from the y-axis positive direction without being covered with the jacket 112.

The optical device 1 can be produced by carrying out (i) the step S1 of forming the jacket-removed section I1 on the optical fiber 11 and (ii) the step S2 of embedding the jacket-removed section I1 of the optical fiber 11 in the resin member 12 having a refractive index higher than that of the inner cladding 111b of the optical fiber 11. The optical device 1 in accordance with the present embodiment can be produced by applying, to the step S1, the above-described method of forming the jacket-removed section I1.

[Effect of Optical Device]

An effect yielded by the optical device 1 in accordance with the present embodiment will be discussed below with reference to FIGS. 4 through 7.

Figure 4:
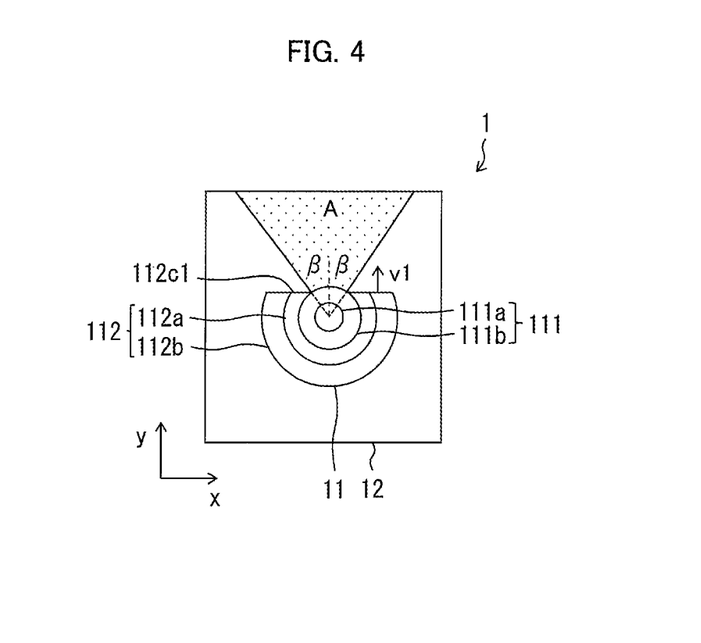
FIG. 4 is a (cross) sectional view of the optical device illustrated in FIG. 1 for describing an effect yielded by the optical device.

FIG. 4 is a sectional view (in which hatching is omitted) illustrating a cross section of the optical device 1 in the jacket-removed section I1 (i.e., the cross section orthogonal to the central axis of the optical fiber 11).

As illustrated in FIG. 4, the optical device 1 employs a configuration in which the jacket-removed section I1 embedded in the resin member 12 is a section in which a part of the jacket 112 is removed so that only a part of the outer surface of the inner cladding 111b (i.e., a part of the outer surface of the inner cladding 111b located in a direction that makes an angle of not more than β[rad] with the y-axis positive direction) is exposed in the cross section. It follows that a region A which is of the resin member 12 and which cladding light having leaked from the outer surface of the inner cladding 111b reaches, i.e., the region A which generates heat in the resin member 12, is restricted to a part of the resin member 12 (i.e., a part of the resin member 12 located in the direction that makes an angle of not more than β[rad] with the y-axis positive direction) (see FIG. 4).

Heat generated inside the region A of the resin member 12 diffuses to outside of the region A. This allows a maximum temperature of the resin member 12, i.e., a temperature of the resin member 12 in the region A, to be lower than that of a conventional optical device in which an entire outer surface of an inner cladding is exposed in a jacket-removed section.

Furthermore, the optical device 1 employs a configuration in which the cut surface 112c1 of the jacket 112 in the jacket-removed section I1 is a flat surface having a normal vector v1 parallel to the radial direction of the optical fiber 11 (i.e., a y-axis positive direction) (see FIG. 4). This prevents the cladding light, having leaked from the outer surface of the inner cladding 111b into the resin member 12, from entering the jacket 112 through the cut surface 112c1. This ultimately prevents the jacket 112 from generating heat due to the cladding light having leaked from the outer surface of the inner cladding 111b into the resin member 12.

Figure 5:
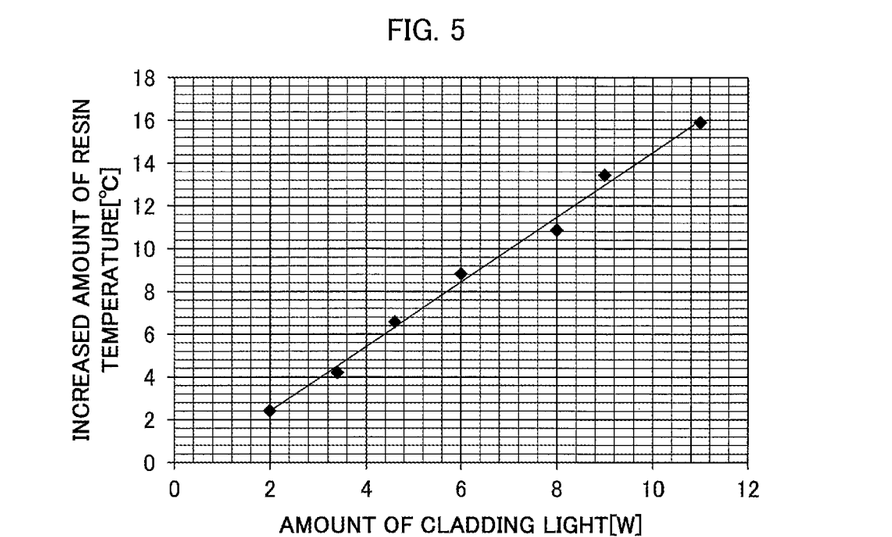
FIG. 5 is a graph showing a relationship between an amount of cladding light and an increased amount of a resin temperature, each of which is obtained in a conventional optical device.
Figure 6:
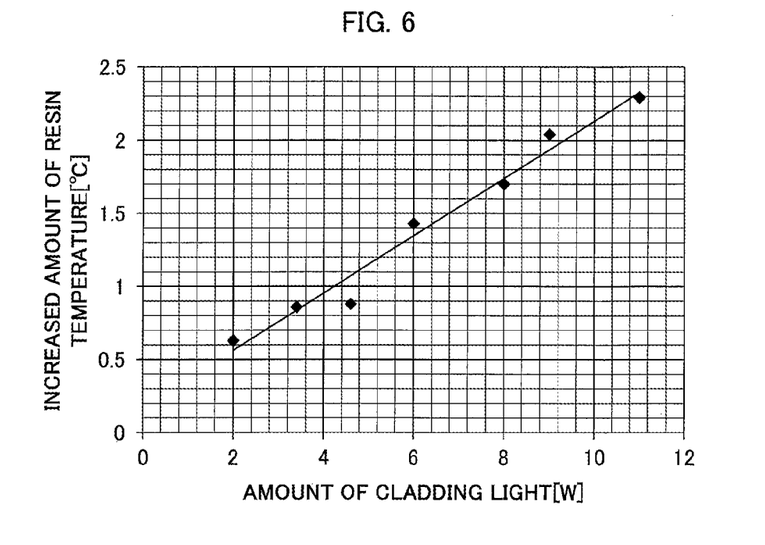
FIG. 6 is a graph showing a relationship between an amount of cladding light and an increased amount of a resin temperature, each of which is obtained in a case where the jacket-removed section of the optical device illustrated in FIG. 1 has a length of 1 mm.
Figure 7:
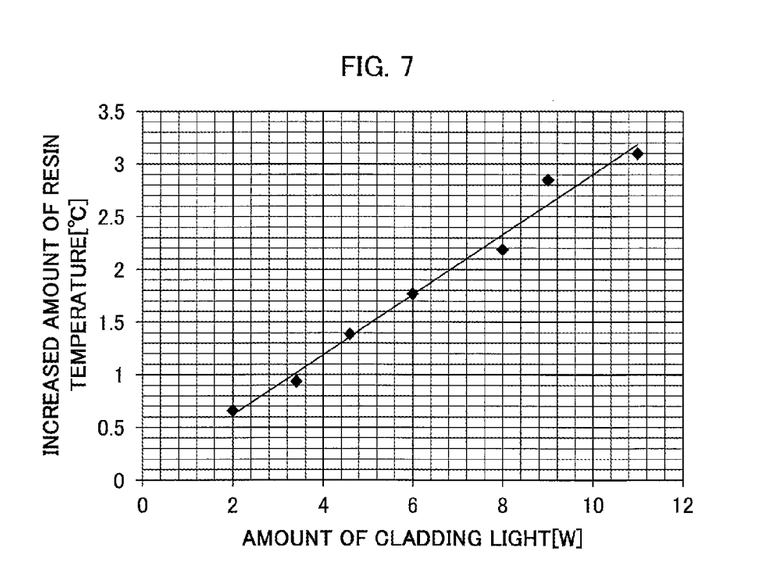
FIG. 7 is a graph showing a relationship between an amount of cladding light and an increased amount of a resin temperature, each of which is obtained in a case where the jacket-removed section of the optical device illustrated in FIG. 1 has a length of 2 mm.

The above-described effect yielded by the optical device in accordance with the present embodiment can be confirmed with reference to FIGS. 5 through 7.

FIG. 5 is a graph showing a relationship between an amount of cladding light and an increased amount of a resin temperature (i.e., a difference between (i) a temperature of a resin member measured in the absence of cladding light and (ii) a maximum temperature of the resin member measured in the presence of cladding light), each of which is obtained in a case where a conventional optical device is used in which an entire outer surface of an inner cladding is exposed in a jacket-removed section. FIG. 6 is a graph showing a relationship between an amount of cladding light and an increased amount of a resin temperature, each of which is obtained in a case where the jacket-removed section I1 of the optical device 1 in accordance with the present embodiment has a length L of 1 mm. FIG. 7 is a graph showing a relationship between an amount of cladding light and an increased amount of resin temperature, each of which is obtained in a case where the jacket-removed section I1 of the optical device 1 in accordance with the present embodiment has a length L of 2 mm.

Note that each of graphs shown in FIGS. 5 through 7 was obtained under conditions where (i) a numerical aperture NA0 of the inner cladding (111b) was 0.3, (ii) a refractive index n0 of the inner cladding (111b) was 1.45, (iii) a thickness t of the resin member (12) was 0.8 mm, and (iv) a refractive index n1 of the resin member (12) was 1.54.

According to the conventional optical device, a graph indicating the increased amount of the resin temperature is at an inclination of 1.51° C./W (see FIG. 5). In contrast, according to the optical device 1 in accordance with the present embodiment, a graph indicating the increased amount of the resin temperature is at an inclination of 0.20° C./W in a case where the jacket-removed section I1 has a length L of 1 mm (see FIG. 6), and the graph indicating the increased amount of the resin temperature is at an inclination of 0.29° C./W in a case where the jacket-removed section I1 has a length L of 2 mm (see FIG. 7). As such, the optical device 1 in accordance with the present embodiment makes it possible to reduce the increased amount of the resin temperature to not more than one-fifth of that of the conventional optical device.

[Preferable Length of Jacket-Removed Section]

Figure 8:
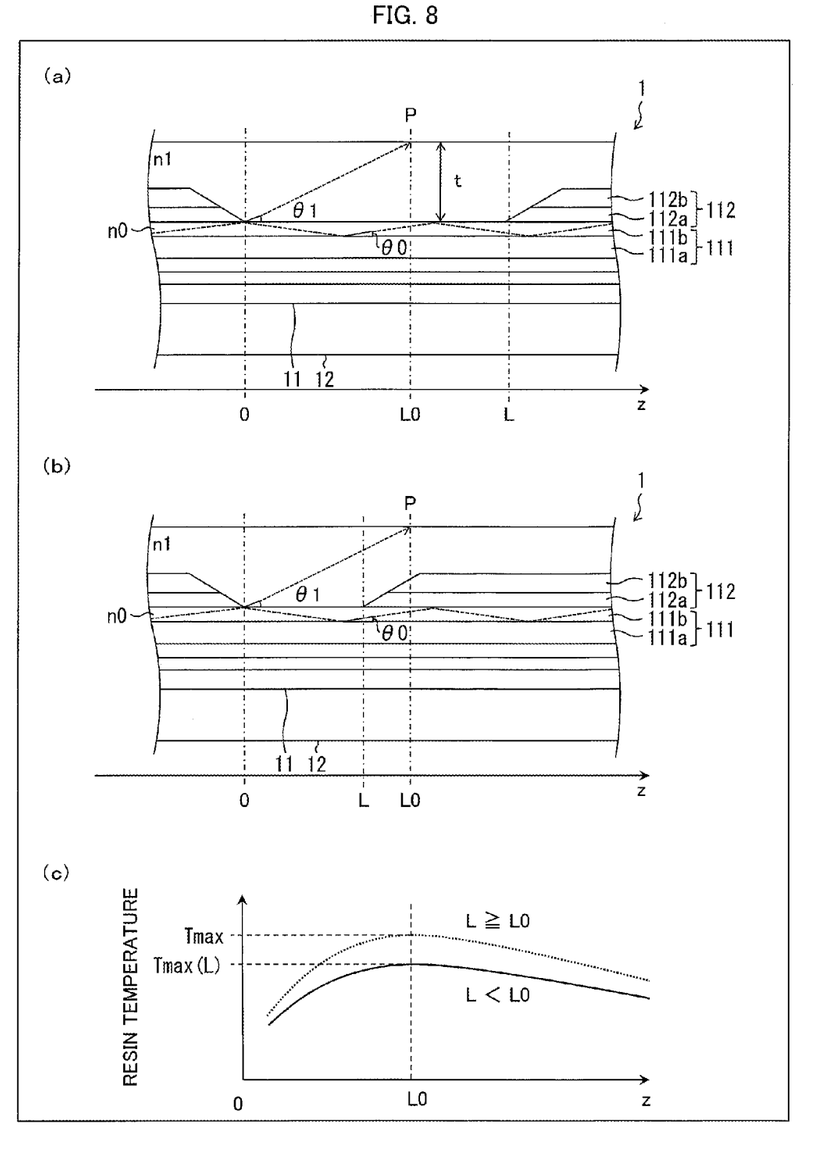
FIG. 8 is a view for describing a preferable length of the jacket-removed section of the optical device illustrated in FIG. 1. Each of (a) and (b) of FIG. 8 is a (longitudinal) sectional view of the optical fiber, and (c) is a graph showing a temperature distribution in the resin member.

A preferable length L of the jacket-removed section I1 will be discussed below with reference to FIG. 8. Each of (a) and (b) of FIG. 8 is a sectional view (in which hatching is omitted) illustrating a longitudinal section of the optical device 1 (i.e., a cross section including the central axis of the optical fiber 11), and (c) of FIG. 8 is a graph showing a temperature distribution in the resin member 12.

The temperature of the resin member 12 reaches its peak at a point P at which cladding light, which has leaked from the outer surface of the inner cladding 111b into the resin member 12 at an entrance end of the jacket-removed section I1, reaches a surface of the resin member 12. A propagation angle θ1 of the cladding light, which has leaked from the outer surface of the inner cladding 111b into the resin member 12, is calculated by the following Equation (2). From this, a distance L0 from the entrance end of the jacket-removed section I1 to the point P, which distance L0 is measured along the central axis (i.e., a z axis in FIG. 8) of the optical fiber 11, is calculated by the following Equation (3).

$$\theta 1 = \cos^{-1}((n0/n1)\cos(\theta 0)) \quad (2)$$

where n0 is the refractive index of the inner cladding 111b, θ0 is a critical propagation angle of the cladding light (here, $\theta 0 = \sin^{-1}(NA0/n0)$ holds true where NA0 is the numerical aperture of the inner cladding 111b), and n1 is the refractive index of the resin member 12.

$$L0 = t/\tan(\theta 1) = t/\tan(\cos^{-1}((n0/n1)\cos(\theta 0))) \quad (3)$$

where t is the thickness of the resin member 12.

In a case where the length L of the jacket-removed section I1 is equal to or longer than L0 as illustrated in (a) of FIG. 8, the temperature distribution in the resin member 12 becomes as indicated by a dotted curve in (c) of FIG. 8. This means that, in a case where the length L of the jacket-removed section I1 is equal to or longer than L1, a temperature of the resin member 12 at the point P, i.e., a maximum temperature Tmax of the resin member 12, is constant regardless of the length L of the jacket-removed section I1.

In contrast, in a case where the length L of the jacket-removed section I1 is shorter than L0 as illustrated in (b) of FIG. 8, the temperature distribution in the resin member 12 becomes as indicated by a solid curve in (c) of FIG. 8. This means that, in a case where the length L of the jacket-removed section I1 is shorter than L0, the temperature of the resin member 12 at the point P, i.e., a maximum temperature Tmax(L) of the resin member 12 varies in accordance with the length L of the jacket-removed section I1. More specifically, the maximum temperature Tmax(L) of the resin member 12 (i) drops as the length L of the jacket-removed section I1 is decreased and (ii) rises as the length of the jacket-removed section I1 is increased.

From the above description, the length L of the jacket-removed section I1 is preferably shorter than L0, which is defined by the above Equation (3). This is because, with such an arrangement, the maximum temperature Tmax(L) of the resin member 12 can be set to be lower than the maximum temperature Tmax, which is of the resin member 12 obtained when L≥L0.

[Preferable Inclination of Cut Surface of Jacket in Adjacent Sections]

Figure 9:
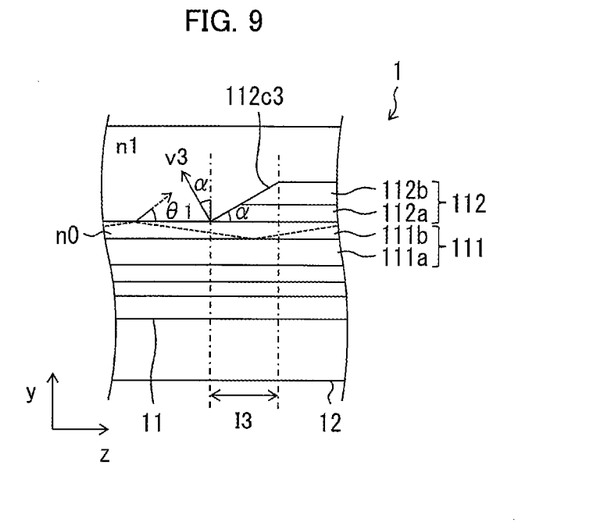
FIG. 9 is a (longitudinal) sectional view of the optical device illustrated in FIG. 1 for describing a preferable inclination of a cut surface of a jacket in the optical device.

A preferable inclination of a cut surface 112c3 of the jacket 112 in the adjacent section I3 on an exit side will be discussed below with reference to FIG. 9. FIG. 9 is a sectional view (in which hatching is omitted) illustrating the longitudinal section of the optical device 1 (i.e., the cross section including the central axis of the optical fiber 11).

As described above, assuming that the refractive index of the inner cladding 111b is represented by n0, the critical propagation angle of the cladding light is represented by θ0, and the refractive index of the resin member 12 is represented by n1, the propagation angle θ1 of the cladding light, which has leaked from the outer surface of the inner cladding 111b into the resin member 12, is calculated by the above Equation (2).

From this, an inclination of the cut surface 112c3 of the jacket 112 in the adjacent section I3 is preferably determined such that an angle α between a normal vector v3 of the cut surface 112c3 and the radial direction of the optical fiber 11 (i.e., the y-axis positive direction illustrated in FIG. 9) satisfies the following Equation (4).

$$\alpha < \theta 1 = \cos^{-1}((n0/n1)\cos(\theta 0)) \quad (4)$$

In a case where the angle α between the normal vector v3 of the cut surface 112c3 and the radial direction of the optical fiber 11 satisfies the above Equation (4), the cladding light, which has leaked from the outer surface of the inner cladding 111b into the resin member 12, does not enter the jacket 112 through the cut surface 112c3. This makes it possible to prevent the jacket 112 from generating heat due to the cladding light which has leaked from the outer surface of the inner cladding 111b into the resin member 12.

Note that an inclination of the cut surface 112c2 of the jacket 112 in the adjacent section I2 on the entrance side is preferably determined as with the inclination of the cut surface 112c3 of the jacket 112 in the adjacent section I3 on the exit side. This makes it possible to prevent the jacket 112 from generating heat due to returning cladding light which has leaked from the outer surface of the inner cladding 111b into the resin member 12.

[Variation 1]

Figure 10:
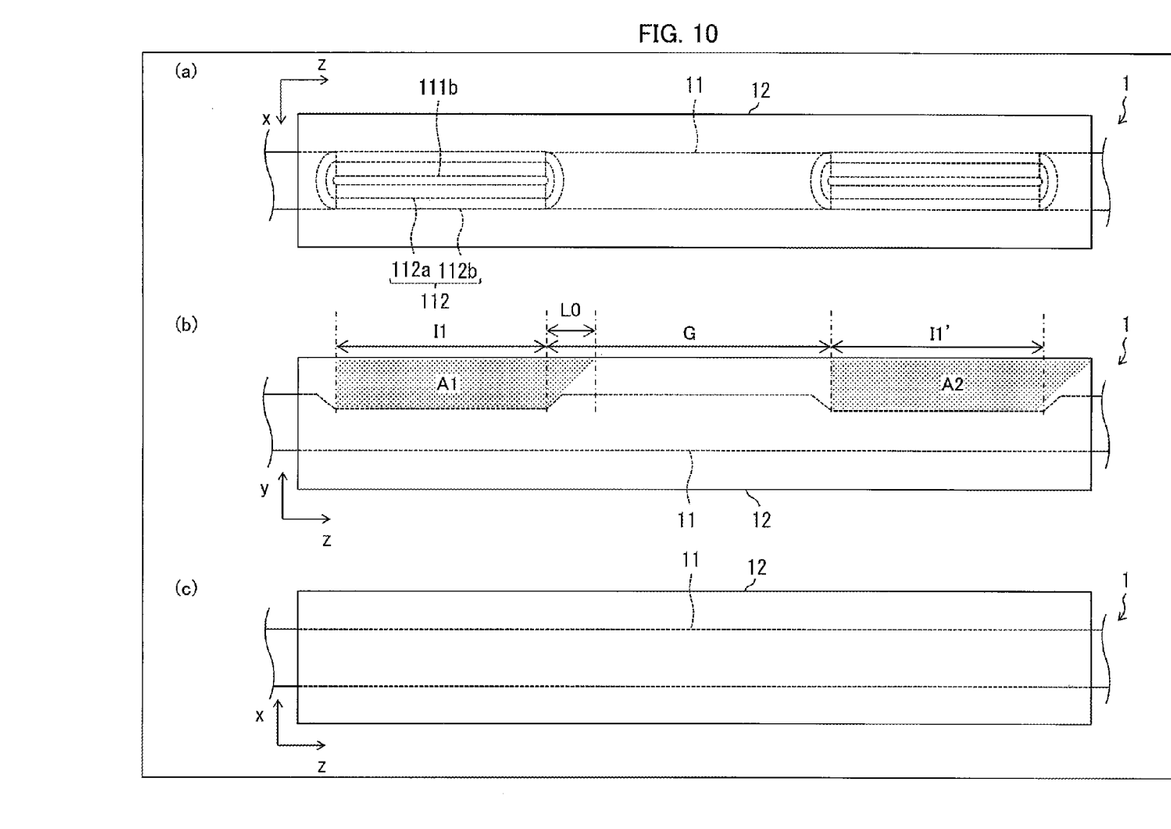
FIG. 10 is a view for describing Variation 1 of the optical device illustrated in FIG. 1. (a) of FIG. 10 is a top view of the optical device, (b) of FIG. 10 is a lateral view of the optical device, and (c) of FIG. 10 is a bottom view of the optical device.

Variation 1 of the optical device 1 will be discussed below with reference to FIG. 10. (a) of FIG. 10 is a top view of an optical device 1 in accordance with Variation 1, (b) of FIG. 10 is a lateral view of the optical device 1 in accordance with Variation 1, and (c) of FIG. 10 is a bottom view of the optical device 1 in accordance with Variation 1.

The optical device 1 in accordance with Variation 1 is obtained by adding a second jacket-removed section I1' to the optical device 1 illustrated in FIG. 1. The second jacket-removed section I1' is identical in structure to a first jacket-removed section I1.

By adding the second jacket-removed section I1', it is possible to increase an amount of cladding light that leaks from an outer surface of an inner cladding 111h into a resin member 12, as compared with the optical device 1 illustrated in FIG. 1.

The outer surface of the inner cladding 111b is exposed in the y-axis positive direction in both of the first jacket-removed section I1 and the second jacket-removed section I1'. A gap G between the jacket-removed sections I1 and I1', in which the outer surface of the inner cladding 111b is exposed in the same direction, is preferably longer than L0 described above.

If the gap G between the jacket-removed sections I1 and I1' is equal to or shorter than L0, in the resin member 12, a region A1 which cladding light having leaked from the outer surface of the inner cladding 111b through the jacket-removed section I1 can reach overlaps with a region A2 which cladding light having leaked from the outer surface of the inner cladding 111b through the jacket-removed section I1' can reach. This may increase a maximum temperature of the resin member 12 in the region A1, as compared with the case where the jacket-removed section I1' is not provided. Such a problem can be eliminated by setting the gap G between the jacket-removed sections I1 and I1' to be longer than L0.

[Variation 2]

Figure 11:
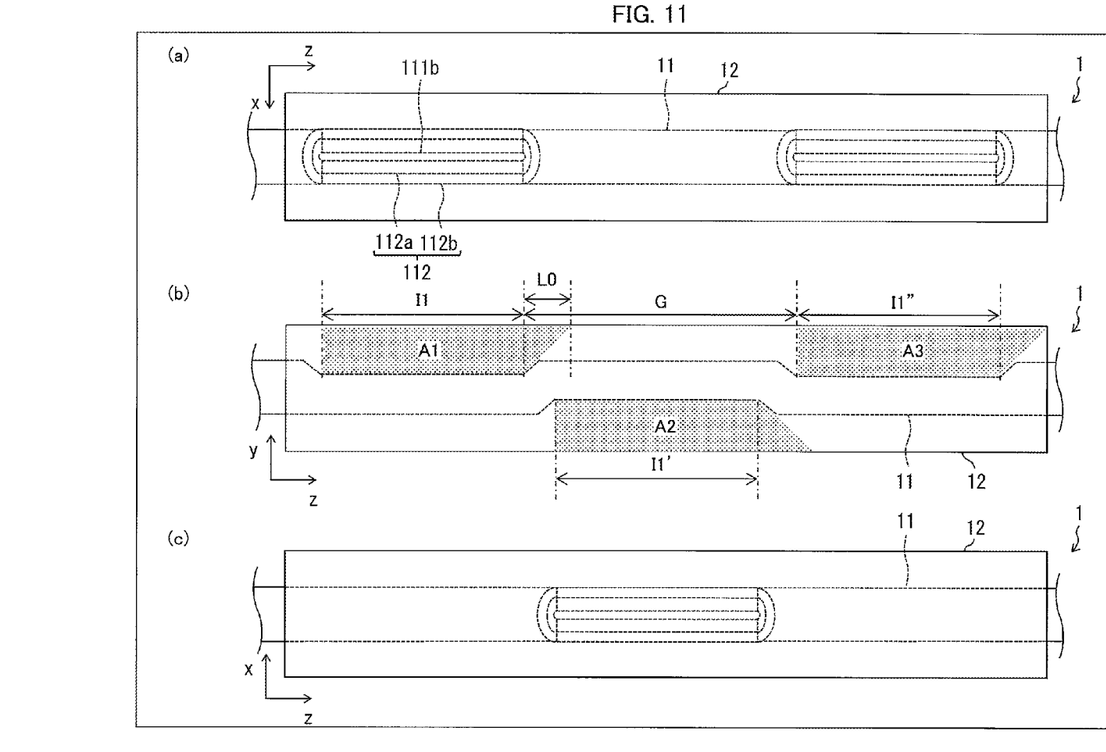
FIG. 11 is a view for describing Variation 2 of the optical device illustrated in FIG. 1. (a) of FIG. 11 is a top view of the optical device, (b) of FIG. 11 is a lateral view of the optical device, and (c) of FIG. 11 is a bottom view of the optical device.

Variation 2 of the optical device 1 will be discussed below with reference to FIG. 11. (a) of FIG. 11 is a top view of an optical device 1 in accordance with Variation 2, (b) of FIG. 11 is a lateral view of the optical device 1 in accordance with Variation 2, and (c) of FIG. 11 is a bottom view of the optical device 1 in accordance with Variation 2.

The optical device 1 in accordance with Variation 2 is obtained by adding a second jacket-removed section I1' and a third jacket-removed section I1" to the optical device 1 illustrated in FIG. 1. Each of the second jacket-removed section I1' and the third jacket-removed section I1" is identical in structure to a first jacket-removed section I1.

By adding the second jacket-removed section I1' and the third jacket-removed section I1", it is possible to increase an amount of cladding light that leaks from an outer surface of an inner cladding 111b into a resin member 12, as compared with the optical device 1 illustrated in FIG. 1.

The outer surface of the inner cladding 111b is exposed in the y-axis positive direction in both of the first jacket-removed section I1 and the third jacket-removed section I1". A gap G between the jacket-removed sections I1 and I1", in which the outer surface of the inner cladding 111b is exposed in the same direction, is preferably longer than L0 described above.

If the gap G between the jacket-removed sections I1 and I1" is equal to or shorter than L0, in the resin member 12, a region A1 which cladding light having leaked from the outer surface of the inner cladding 111b through the jacket-removed section I1 can reach overlaps with a region A3 which cladding light having leaked from the outer surface of the inner cladding 111b through the jacket-removed section I1" can reach. This may increase a maximum temperature of the resin member 12 in the region A1, as compared with the case where the jacket-removed section I1" is not provided. Such a problem is eliminated by setting the gap G between the jacket-removed sections I1 and I1" to be longer than L0.

The first jacket-removed section I1 and the second jacket-removed section I1' are adjacent to each other. Moreover, the second jacket-removed section I1' and the third jacket-removed section I1" are adjacent to each other. It is preferable that the outer surface of the inner cladding 111b be exposed in different directions as in the jacket-removed sections I1 and I1'(I1' and I1") which are adjacent to each other.

If the outer surface of the inner cladding 111b is exposed in the same direction in the adjacent jacket-removed sections I1 and I1'(I1' and I1"), a region A1 (A2) which cladding light having leaked from the outer surface of the inner cladding 111b through the jacket-removed section I1 (I1') can reach overlaps with a region A2 (A3), which cladding light having leaked from the outer surface of the inner cladding 111b through the jacket-removed section I1'(I1") can reach. This may increase the maximum temperature of the resin member 12 in the region A1 (A2), as compared with the case where the jacket-removed section I1' (I1") is not provided. Such a problem eliminated by setting the outer surface of the inner cladding 111b to be exposed in different directions in the adjacent jacket-removed sections I1 and I1' (I1' and I1").

[Main Points]

An optical device in accordance with an embodiment of the present invention includes: an optical fiber in which at least one jacket-removed section is provided; and a resin member in which the at least one jacket-removed section of the optical fiber is embedded, the resin member having a refractive index higher than a refractive index of a cladding of the optical fiber, the at least one jacket-removed section being a section in which a jacket covering an outer surface of the cladding has been partially removed so that only a part of the outer surface of the cladding is exposed in a cross section of the optical fiber.

According to the above configuration, only a part of the outer surface of the cladding is exposed in the cross section of the jacket-removed section, so that it is possible to restrict a region which cladding light having leaked from the cladding reaches in the resin member, i.e., a region which generates heat in the resin member, to a part of a region in the resin member. The heat generated in the region of the resin member diffuses to outside of the region. As such, the above configuration makes it possible to reduce a maximum temperature of the resin member, as compared with a conventional optical device in which an entire outer surface of a cladding is exposed in a cross section in a jacket-removed section.

An optical device in accordance with an embodiment of the present invention is preferably configured such that a length L of the at least one jacket-removed section is shorter than L0 which is defined by Equation (A) below:

$$L0 = t/\tan(\cos^{-1}((n0/n1)\cos(\theta 0))) \qquad (A)$$

where n0 is the refractive index of the cladding, θ0 is a critical propagation angle of light that propagates in the cladding, n1 is the refractive index of the resin member, and t is a thickness of the resin member.

The above configuration makes it possible to reduce the maximum temperature of the resin member, as compared with the case where the length L of the jacket-removed section is equal to or longer than L0.

An optical device in accordance with an embodiment of the present invention is preferably configured such that the at least one jacket-removed section of the optical fiber includes a plurality of jacket-removed sections.

The above configuration makes it possible to increase an amount of cladding light that leaks from the cladding into the resin member, as compared with the case where only one jacket-removed section is provided.

An optical device in accordance with an embodiment of the present invention is preferably configured such that the plurality of jacket-removed sections include two jacket-removed sections in which the outer surface of the cladding is exposed in identical directions; and a gap G between the two jacket-removed sections is longer than L0 which is defined by Equation (A) below:

$$L0 = t/\tan(\cos^{-1}((n0/n1)\cos(\theta 0))) \qquad (A)$$

where n0 is the refractive index of the cladding, θ0 is a critical propagation angle of light that propagates in the cladding, n1 is the refractive index of the resin member, and t is a thickness of the resin member.

The above configuration makes it possible to increase the amount of cladding light that leaks from the cladding into the resin member, as compared with the case where only one jacket-removed section is provided, without increasing the maximum temperature of the resin member.

An optical device in accordance with an embodiment of the present invention is preferably configured such that the outer surface of the cladding is exposed in different directions in adjacent two of the plurality of jacket-removed sections.

The above configuration makes it possible to increase the amount of cladding light that leaks from the cladding into the resin member, as compared with the case where only one jacket-removed section is provided, without increasing the maximum temperature of the resin member.

An optical device in accordance with an embodiment of the present invention is preferably configured such that a cut surface of the jacket in the at least one jacket-removed section is a flat surface having a normal vector that is parallel to a radial direction of the optical fiber.

The above configuration makes it possible to prevent light, which has leaked from the cladding into the resin member, from entering the jacket through the cut surface.

An optical device in accordance with an embodiment of the present invention is preferably configured such that a cut surface of the jacket in an adjacent section adjacent to the at least one jacket-removed section is a flat surface having a normal vector that makes, with a radial direction of the optical fiber, an angle α that satisfies Equation (B) below:

$$\alpha < \cos^{-1}((n0/n1)\cos(\theta 0)) \tag{B}$$

where n0 is the refractive index of the cladding, θ0 is a critical propagation angle of light that propagates in the cladding, and n1 is the refractive index of the resin member.

The above configuration makes it possible to prevent light, which has leaked from the cladding into the resin member, from entering the jacket through the cut surface.

An optical device in accordance with an embodiment of the present invention can employ, for example, a double cladding fiber as the optical fiber. In this case, the at least one jacket-removed section can be provided by partially removing an outer cladding and an outer jacket so that only a part of an outer surface of an inner cladding is exposed in a cross section of the double cladding fiber.

A method of producing an optical fiber in accordance with an embodiment of the present invention includes the steps of: forming a jacket-removed section in an optical fiber; and embedding the jacket-removed section of the optical fiber in a resin member having a refractive index higher than a refractive index of a cladding of the optical fiber, the jacket-removed section being a section in which a jacket covering an outer surface of the cladding has been partially removed so that only a part of the outer surface of the cladding is exposed in a cross section of the optical fiber. In other words, a method of producing an optical fiber in accordance with an embodiment of the present invention includes the steps of (i) forming a jacket-removed section in an optical fiber and (ii) embedding the jacket-removed section of the optical fiber in a resin member having a refractive index higher than that of cladding of the optical fiber, the step of forming the jacket-removed section being a step of partially removing a jacket covering an outer surface of the cladding in the jacket-removed section so that only a part of the outer surface of the cladding is exposed in a cross section in the jacket-removed section.

The above configuration makes it possible to produce an optical device whose resin member is less likely to reach a high temperature, as compared with that of a conventional optical device.

[Additional Remark]

The present invention is not limited to the embodiments described herein, but can be altered by a skilled person in the art within the scope of the claims. That is, an embodiment derived from a proper combination of technical means appropriately modified within the scope of the claims is also encompassed in the technical scope of the present invention.

INDUSTRIAL APPLICABILITY

The present invention is applicable to a general optical fiber such as a double cladding fiber and a triple cladding fiber in which light can be confined to a cladding. The present invention is also applicable to a fiber laser, a fiber amplifier, and the like.

REFERENCE SIGNS LIST

1 Optical device
11 Optical fiber
111 Bare fiber
111a Core
111b Inner cladding (cladding)
112 Jacket
112a Outer cladding
112b Outer jacket
112c1 Cut surface of jacket in jacket-removed section
112c2 and 112c3 Cut surface of jacket in adjacent section
I1, I1', and I1" Jacket-removed section
I2 and I3 Adjacent section
12 Resin member
L Length of jacket-removed section
n0 Refractive index of inner cladding
θ0 Critical propagation angle of cladding light (light that propagates in cladding)
n1 Refractive index of resin member
t Thickness of resin member
v1 Normal vector of cut surface of jacket in jacket-removed section
v2 and v3 Normal vector of cut surface of jacket in adjacent section

The invention claimed is:

1. An optical device, comprising:
   an optical fiber in which at least one jacket-removed section is provided; and
   a resin member in which the at least one jacket-removed section of the optical fiber is embedded, the resin member having a refractive index higher than a refractive index of a cladding of the optical fiber,
   the at least one jacket-removed section being a section in which a jacket covering an outer surface of the cladding has been partially removed so that only a part of the outer surface of the cladding is exposed in a cross section of the optical fiber; and
   two cut surfaces of the jacket in the at least one jacket-removed section, between which two cut surfaces a portion of the cladding of the optical fiber which portion is exposed in the at least one jacket-removed section is sandwiched, are located on the same plane.

2. The optical device as set forth in claim 1, wherein:
   a length L of the at least one jacket-removed section is shorter than L0 which is defined by Equation (A) below:

$$L0 = t/\tan(\cos^{-1}((n0/n1)\cos(\theta 0))) \tag{A}$$

where n0 is the refractive index of the cladding, θ0 is a critical propagation angle of light that propagates in the cladding, n1 is the refractive index of the resin member, and t is a thickness of the resin member.

3. The optical device as set forth in claim 1, wherein:
   the at least one jacket-removed section of the optical fiber includes a plurality of jacket-removed sections.

4. The optical device as set forth in claim 3, wherein:
   the plurality of jacket-removed sections include two jacket-removed sections in which the outer surface of the cladding is exposed in identical directions; and
   a gap G between the two jacket-removed sections is longer than L0 which is defined by Equation (A) below:

$$L0 = t/\tan(\cos^{-1}((n0/n1)\cos(\theta 0))) \tag{A}$$

where n0 is the refractive index of the cladding, θ0 is a critical propagation angle of light that propagates in the cladding, n1 is the refractive index of the resin member, and t is a thickness of the resin member.

5. The optical device as set forth in claim 3, wherein:
the outer surface of the cladding is exposed in different directions in adjacent two of the plurality of jacket-removed sections.

6. The optical device as set forth in claim 1, wherein:
a cut surface of the jacket in an adjacent section adjacent to the at least one jacket-removed section is a flat surface having a normal vector that makes, with a radial direction of the optical fiber, an angle α that satisfies Equation (B) below:

$$\alpha < \cos^{-1}((n0/n1)\cos(\theta 0)) \tag{B}$$

where n0 is the refractive index of the cladding, θ0 is a critical propagation angle of light that propagates in the cladding, and n1 is the refractive index of the resin member.

7. The optical device as set forth in claim 1, wherein:
the optical fiber includes:
a core which is made of glass;
an inner cladding which is made of glass and covers a side surface of the core;
an outer cladding which is made of resin and covers an outer surface of the inner cladding; and
an outer jacket which is made of resin and covers an outer surface of the outer cladding;
the cladding is the inner cladding; and
the jacket includes the outer cladding and the outer jacket.

8. A method of producing an optical device, comprising the steps of:
forming a jacket-removed section in an optical fiber; and
embedding the jacket-removed section of the optical fiber in a resin member having a refractive index higher than a refractive index of a cladding of the optical fiber,
the jacket-removed section being a section in which a jacket covering an outer surface of the cladding has been partially removed so that only a part of the outer surface of the cladding is exposed in a cross section of the optical fiber; and
two cut surfaces of the jacket in the at least one jacket-removed section, between which two cut surfaces a portion of the cladding of the optical fiber which portion is exposed in the at least one jacket-removed section is sandwiched, being located on the same plane.

9. An optical device, comprising:
an optical fiber in which at least one jacket-removed section is provided; and
a resin member in which the at least one jacket-removed section of the optical fiber is embedded, the resin member having a refractive index higher than a refractive index of a cladding of the optical fiber,
the at least one jacket-removed section being a section in which a jacket covering an outer surface of the cladding has been partially removed so that only a part of the outer surface of the cladding is exposed in a cross section of the optical fiber,
wherein:
a length L of the at least one jacket-removed section is shorter than L0 which is defined by Equation (A) below:

$$L0 = t/\tan(\cos^{-1}((n0/n1)\cos(\theta 0))) \tag{A}$$

where n0 is the refractive index of the cladding, θ0 is a critical propagation angle of light that propagates in the cladding, n1 is the refractive index of the resin member, and t is a thickness of the resin member.

10. An optical device, comprising:
an optical fiber in which at least one jacket-removed section is provided; and
a resin member in which the at least one jacket-removed section of the optical fiber is embedded, the resin member having a refractive index higher than a refractive index of a cladding of the optical fiber,
the at least one jacket-removed section being a section in which a jacket covering an outer surface of the cladding has been partially removed so that only a part of the outer surface of the cladding is exposed in a cross section of the optical fiber,
wherein the at least one jacket-removed section of the optical fiber includes a plurality of jacket-removed sections,
wherein:
the plurality of jacket-removed sections include two jacket-removed sections in which the outer surface of the cladding is exposed in identical directions; and
a gap G between the two jacket-removed sections is longer than L0 which is defined by Equation (A) below:

$$L0 = t/\tan(\cos^{-1}((n0/n1)\cos(\theta 0))) \tag{A}$$

where n0 is the refractive index of the cladding, θ0 is a critical propagation angle of light that propagates in the cladding, n1 is the refractive index of the resin member, and t is a thickness of the resin member.

11. An optical device, comprising:
an optical fiber in which at least one jacket-removed section is provided; and
a resin member in which the at least one jacket-removed section of the optical fiber is embedded, the resin member having a refractive index higher than a refractive index of a cladding of the optical fiber,
the at least one jacket-removed section being a section in which a jacket covering an outer surface of the cladding has been partially removed so that only a part of the outer surface of the cladding is exposed in a cross section of the optical fiber,
wherein:
a cut surface of the jacket in an adjacent section adjacent to the at least one jacket-removed section is a flat surface having a normal vector that makes, with a radial direction of the optical fiber, an angle α that satisfies Equation (B) below:

$$\alpha < \cos^{-1}((n0/n1)\cos(\theta 0)) \tag{B}$$

where n0 is the refractive index of the cladding, θ0 is a critical propagation angle of light that propagates in the cladding, and n1 is the refractive index of the resin member.

* * * * *